US009581726B2

(12) United States Patent
Rangarajan et al.

(10) Patent No.: US 9,581,726 B2
(45) Date of Patent: Feb. 28, 2017

(54) ATTRIBUTE IMPORTANCE DETERMINATION

(71) Applicant: Landmark Graphics Corporation, Houston, TX (US)

(72) Inventors: Keshava P Rangarajan, Sugarland, TX (US); Serkan Dursun, Missouri City, TX (US); Amit Kumar Singh, Houston, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 0 days.

(21) Appl. No.: 14/420,271

(22) PCT Filed: Dec. 5, 2013

(86) PCT No.: PCT/US2013/073398
§ 371 (c)(1),
(2) Date: Feb. 6, 2015

(87) PCT Pub. No.: WO2014/193474
PCT Pub. Date: Dec. 4, 2014

(65) Prior Publication Data
US 2015/0285951 A1   Oct. 8, 2015

Related U.S. Application Data

(60) Provisional application No. 61/829,665, filed on May 31, 2013.

(51) Int. Cl.
*G06F 7/60* (2006.01)
*G06G 7/48* (2006.01)
*G01V 99/00* (2009.01)

(52) U.S. Cl.
CPC ........ *G01V 99/005* (2013.01); *G01V 2210/62* (2013.01)

(58) Field of Classification Search
None
See application file for complete search history.

(56) References Cited

U.S. PATENT DOCUMENTS 5,274,714 A * 12/1993 Hutcheson ......... G06K 9/00221
382/157
5,465,308 A * 11/1995 Hutcheson ......... G06K 9/00221
382/156

(Continued)

FOREIGN PATENT DOCUMENTS

EP          1587008 A2     10/2005
KR   10-2007-0069701 A      7/2007

OTHER PUBLICATIONS

Dasgupta, Debasish; Patent Examination Report No. 1; dated Jul. 4, 2016; 2 pages; Patent Application No. 2013390812; Australian Intellectual Propert Office; Australia.

(Continued)

*Primary Examiner* — Omar Fernandez Rivas
*Assistant Examiner* — Nithya J Moll
(74) *Attorney, Agent, or Firm* — Polsinelli PC

(57) ABSTRACT

A system and method for determination of importance of attributes among a plurality of attribute importance models incorporating a segmented attribute kerneling (SAK) method of attribute importance determination. The method permits operation of multiple attribute importance algorithms simultaneously, finds the intersecting subset of important attributes across the multiple techniques, and then outputs a consolidated ranked set. In addition, the method identifies and presents a ranked subset of the attributes excluded from the union.

20 Claims, 5 Drawing Sheets

(56) References Cited

U.S. PATENT DOCUMENTS

| | | | | |
|---|---|---|---|---|
| 6,560,540 | B2* | 5/2003 | West | G01V 1/32 702/14 |
| 8,930,170 | B2* | 1/2015 | McLennan | G06F 17/18 703/10 |
| 9,014,982 | B2* | 4/2015 | Da Costa Paiva | G01V 1/362 702/13 |
| 2003/0212691 | A1 | 11/2003 | Kuntala et al. | |
| 2010/0186950 | A1 | 7/2010 | Neelamani et al. | |
| 2010/0332434 | A1 | 12/2010 | Pawar et al. | |
| 2011/0119040 | A1 | 5/2011 | Mclennan | |

OTHER PUBLICATIONS

Kihwan Moon; International Preliminary Report on Patentability, PCT/US2013/073398, Dec. 10, 2015, 6 pages, ISA/KR.

First Office Action for Chinese Patent Application No. 201380076199.X; Apr. 21, 2016; pp. 1-6; Chinese Patent Office.

Office Action for Canadian Patent Application No. 2,910,829; Nov. 17, 2015; 3 pgs; Canadian Patent Office.

Response to Office Action for Canadian Patent Application No. 2,910,829; Feb. 18, 2016; 31 pgs; Canadian Patent Office.

A. Blum and P. Langley, "Selection of Relevant Features and Examples in Machine Learning," Artificial Intelligence, vol. 97, Nos. 1-2, pp. 245-274, 1997.

M. Dash and H. Liu, "Feature Selection for Classification," Intelligent Data Analysis, vol. 1, No. 3, 1997; 9 pgs.

Data Mining, Practical Machine Learning Tools and Techniques 3rd Edition, Elsevier, 2011; Ian H. Witten, Eibe Frank, Mark A. Hall; 665 pgs.

M.A. Hall, "Correlation-Based Feature Selection for Machine Learning," PhD thesis, Dept. of Computer Science, Univ. of Waikato, Hamilton, New Zealand, 1998; 198 pgs.

M. Hall, "Feature Selection for Discrete and Numeric Class Machine Learning," Proc. 17th Int'l Conf. Machine Learning (ICML2000), 2000; 16 pgs.

H. Almuallim and T.G. Dietterich, "Learning with Many Irrelevant Features," Proc. Ninth Nat'l Conf. Artificial Intelligence, pp. 547-552, 1991.

H. Liu and R. Setiono, "A Probabilistic Approach to Feature Selection: A Filter Solution," Proc. 13th Int'l Conf. Machine Learning, pp. 319-327, 1996.

K. Kira and L. Rendell, "A Practical Approach to Feature Selection," Proc. Ninth Int'l Conf. Machine Learning, pp. 249-256, 1992.

M.A. Hall, Goeffrey Holmes "Benchmarking Attribute Selection Techniques for Dsicrete Class Data Mining" IEEE Transactions on Knowledge and Data Engineering, vol. 15, No. 6, 2003; 16 pgs.

Domingos, P. and Pazzani, M. (1997) On the Optimality of the Simple Bayesian Classifier under Zero-One Loss. Machine Learning, 29. pp. 103-130.

Freund, Yoav, and Schapire, R. E. (1996) Experiments with a new boosting algorithm. In Machine Learning: Proceedings of the Thirteen International Conference, pp. 148-156.

Greene, D., P. and Smith, S. F. (1993) Competition-based induction of decision models from examples. Machine Learning, 13, pp. 229-257.

Mitchell, Tom. (1997) Machine Learning. New York McGraw-Hill; 421 pgs.

Nguyen, D. and Widrow, B. (1990) Improving the Learning Speed of Two-Layer Networks by Choosing Initial Values of the Adaptive Weights. International Joint Conference on Neural Networks, San Diego, CA, pp. III:21-III:26.

Quinlan, J.R. (1986) Induction of Decision Trees. Machine Learning, 1, pp. 81-106.

Quinlan, J.R. (1987) Simplifying Decision Trees. International Journal of Man-Machine Studies, 27, 1 pg.

Quinlan, J. R. (1996) Bagging, Boosting, and C4.5. In Proceedings of the Thirteenth National Conference on Artificial Intelligence, pp. 725-730.

Commissioner; International Search Report and the Written Opinion of the International Searching Authority, PCT/US2013/073398, Mar. 17, 2014, 9 pages, ISA/KR.

* cited by examiner

ATTRIBUTE IMPORTANCE DETERMINATION

CROSS-REFERENCE TO RELATED APPLICATIONS

This application claims the priority of PCT Patent Application No. PCT/US2013/73398, filed on Dec. 5, 2013, which is incorporated herein by reference. PCT Patent Application No. PCT/US2013/73398 claims the priority of U.S. Patent Application Ser. No. 61/829,665, filed on May 31, 2013, which is incorporated herein by reference.

STATEMENT REGARDING FEDERALLY SPONSORED RESEARCH

Not applicable.

FIELD OF THE DISCLOSURE

The present disclosure generally relates to attribute importance methods for use in connection with drilling, production, reservoir simulation and seismic analysis. In particular, the present disclosure relates to attribute importance determination using segmented attribute kerneling ("SAK") for application to a dataset incorporating real-time drilling surface data logs and drilling parameters.

BACKGROUND

Upstream oil and gas industry services work to deliver success throughout the life cycle of the reservoir. However, conventional sources of oil and gas are declining; therefore operators are increasingly turning their attention to unexplored and underdeveloped areas. This includes high pressure/temperature and deepwater areas, as well as working to increase recoveries in mature fields. As reservoirs become more complex and drilling operations become more expensive, there is a growing need to reduce inefficiencies and costs. Petroleum engineers are increasingly using optimized formation evaluation techniques, software with three-dimensional visualization, and multi-disciplinary data interpretation techniques. In addition, data from new downhole equipment provides reliable, real-time information about downhole conditions. With these improved techniques and better data, operators can model, predict, and control their operations better in real-time, thereby reducing inefficiencies and cost. However, this massive integration of varied data moving in higher volumes and at increased speeds has put an increasing demand on the computation and use of actionable and predictive data-driven analytics. Furthermore, these analytics must work in real-time so as to quickly discover the important critical data attributes and features for use in forecasting.

Attribute importance is a well-known statistical technique used to identify critical attributes and features within a set of attributes that could impact a specific target. Various standard and custom techniques—each having their own strengths and weaknesses—are available for performing attribute importance. Each technique applies a different function to evaluate the importance of an attribute and produces a ranked subset of attributes. Therefore, it is possible to arrive at different subsets of important attributes based on the choice of the various attribute importance techniques.

Attribute importance techniques have been successfully applied to a wide range of problems in the oil and gas space including drilling, production, reservoir simulation and seismic analysis. In data mining, attribute importance techniques can be used to input parameters for other types of data mining algorithms or discover knowledge by itself. In this latter task, the rules that such techniques found are usually general because of each techniques global search and rank nature. In contrast, most other data mining methods are based on the rule induction paradigm, where the algorithm usually performs a type of local search. The advantage of such techniques becomes more obvious when the attribute space of a task is unmanageably large. While use of multiple statistical techniques to perform attribute importance is common and valuable, deriving a final set of ranked important attributes that accommodates the output of such techniques is a time consuming, manual and error prone task.

BRIEF DESCRIPTION OF THE DRAWINGS

The present invention is described below with references to the accompanying drawings in which like elements are referenced with like reference numerals, and in which.

DETAILED DESCRIPTION OF THE PREFERRED EMBODIMENTS

Figure 1A:
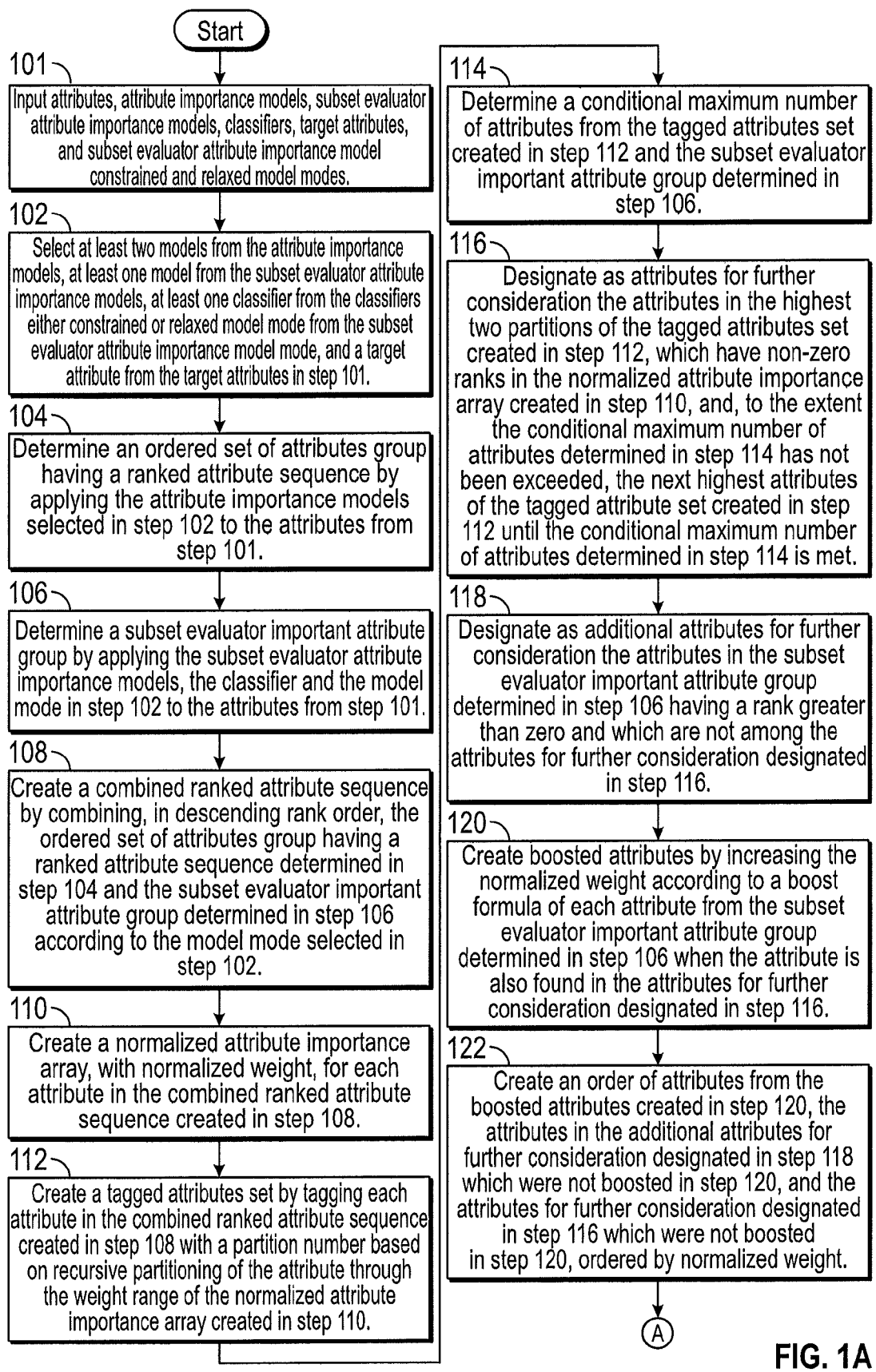
FIGS. 1A and 1B are a flow diagram illustrating one embodiment of a method for implementing the present disclosure.

The present disclosure therefore, overcomes one or more deficiencies in the prior art by providing systems and methods for attribute importance determination using segmented attribute kerneling.

SUMMARY OF THE INVENTION

In one embodiment, the present disclosure includes a method for determination of importance of attributes identified in a plurality of attribute importance models selected from a plurality of available attribute importance models, comprising: i) determining an ordered set of attributes group by applying the plurality of attribute importance models to the plurality of attributes, the ordered set of attributes group having a plurality of attributes with a ranked attribute sequence; ii) determining a subset evaluator important attribute group by applying at least one subset evaluator attribute importance model, and at least one classifier to the plurality of attributes; iii) creating a combined ranked attribute sequence by combining, in descending rank order, the ordered set of attributes group and the subset evaluator important attribute group according to one of a constrained model mode and a relaxed model mode; iv) creating a normalized attribute importance array for each attribute in the combined ranked attribute sequence, the normalized importance array having a normalized weight; v) creating a tagged attributes set by tagging each attribute in the combined ranked attribute sequence with a partition number based on recursive partitioning of the plurality of attributes through a weight range of the normalized attribute importance array; vi) determining a conditional maximum number of attributes from the tagged attributes set and the subset evaluator important attribute group; vii) designating, as attributes for further consideration, the plurality of attributes in a highest two partitions of the tagged attributes set having a nonzero rank in the normalized attribute importance array and a next highest attribute in the tagged attributes set until the conditional maximum number of attributes is met; viii) designating, as additional attributes for further consideration, each of the plurality of attributes in the subset evaluator important attribute group having a rank greater than zero and which are not designated as attributes for further consideration; ix) creating boosted attributes by increasing a normalized weight of each attribute in the subset evaluator important attribute group which is also designated as an attribute for further consideration; x) creating an order of attributes according to the normalized weight for each respective attribute, from the boosted attributes, the attributes designated for further consideration that are not in the boosted attributes, and the additional attributes designated for further consideration that are not in the boosted attributes; xi) generating an ordered attribute set for each attribute in one of the order of attributes and a modified order of attributes by ordering each occurrence of each attribute in each of the plurality of attribute importance models in a descending order according to a number of occurrences; xii) producing a normalized global rank for each attribute in one of the order of attributes and the modified order of attributes by multiplying the number of occurrences of each attribute in one of the order of attributes and the modified order of attributes by a number of occurrences of each attribute in each ordered attribute set, an average of the normalized weight of each respective attribute from the normalized attribute importance array and the normalized weight of each attribute from the boosted attributes; xiii) generating one of a normalized ranking list and a modified normalized ranking list for each attribute in the normalized global rank using a computer processor; and xiv) adjusting drilling operations based on one of the normalized ranking list and the modified normalized ranking list.

In another embodiment, the present disclosure includes a non-transitory storage device carrying computer executable instructions for determination of importance of attributes identified in a plurality of attribute importance models selected from a plurality of available attribute importance models, the instructions being executable to implement: i) determining an ordered set of attributes group by applying the plurality of attribute importance models to the plurality of attributes, the ordered set of attributes group having a plurality of attributes with a ranked attribute sequence; ii) determining a subset evaluator important attribute group by applying at least one subset evaluator attribute importance model, and at least one classifier to the plurality of attributes; iii) creating a combined ranked attribute sequence by combining, in descending rank order, the ordered set of attributes group and the subset evaluator important attribute group according to one of a constrained model mode and a relaxed model mode; iv) creating a normalized attribute importance array for each attribute in the combined ranked attribute sequence, the normalized importance array having a normalized weight; v) creating a tagged attributes set by tagging each attribute in the combined ranked attribute sequence with a partition number based on recursive partitioning of the plurality of attributes through a weight range of the normalized attribute importance array; vi) determining a conditional maximum number of attributes from the tagged attributes set and the subset evaluator important attribute group; vii) designating, as attributes for further consideration, the plurality of attributes in a highest two partitions of the tagged attributes set having a non-zero rank in the normalized attribute importance array and a next highest attribute in the tagged attributes set until the conditional maximum number of attributes is met; viii) designating, as additional attributes for further consideration, each of the plurality of attributes in the subset evaluator important attribute group having a rank greater than zero and which are not designated as attributes for further consideration; ix) creating boosted attributes by increasing a normalized weight of each attribute in the subset evaluator important attribute group which is also designated as an attribute for further consideration; x) creating an order of attributes according to the normalized weight for each respective attribute, from the boosted attributes, the attributes designated for further consideration that are not in the boosted attributes, and the additional attributes designated for further consideration that are not in the boosted attributes; xi) generating an ordered attribute set for each attribute in one of the order of attributes and a modified order of attributes by ordering each occurrence of each attribute in each of the plurality of attribute importance models in a descending order according to a number of occurrences; xii) producing a normalized global rank for each attribute in one of the order of attributes and the modified order of attributes by multiplying the number of occurrences of each attribute in one of the order of attributes and the modified order of attributes by a number of occurrences of each attribute in each ordered attribute set, an average of the normalized weight of each respective attribute from the normalized attribute importance array and the normalized weight of each attribute from the boosted attributes; generating one of a normalized ranking list and a modified normalized ranking list for each attribute in the normalized global rank; and xiv) adjusting drilling operations based on one of the normalized ranking list and the modified normalized ranking list.

In yet another embodiment, the present disclosure includes a non-transitory storage device carrying computer executable instructions for determination of importance of attributes identified in a plurality of attribute importance models selected from a plurality of available attribute importance models, the instructions being executable to implement: i) determining an ordered set of attributes group by applying the plurality of attribute importance models to the plurality of attributes, the ordered set of attributes group having a plurality of attributes with a ranked attribute sequence; ii) determining a subset evaluator important attribute group by applying at least one subset evaluator attribute importance model, and at least one classifier to the attributes; iii) creating a combined ranked attribute sequence by combining, in descending rank order, the ordered set of attributes group and the subset evaluator important attribute group according to a constrained model mode that limits each attribute in the combined ranked attribute sequence to each attribute in the subset evaluator important attribute group; iv) creating a normalized attribute importance array for each attribute in the combined ranked attribute sequence, the normalized importance array having a normalized weight; v) creating a tagged attributes set by tagging each attribute in the combined ranked attribute sequence with a partition number based on recursive partitioning of the plurality of attributes through a weight range of the normalized attribute importance array; vi) determining a conditional maximum number of attributes from the tagged attributes set and the subset evaluator important attribute group; vii) designating, as attributes for further consideration, the plurality of attributes in a highest two partitions of the tagged attributes set having a non-zero rank in the normalized attribute importance array and a next highest attribute in the tagged attributes set until the conditional maximum number of attributes is met; viii) designating, as additional attributes for further consideration, each of the plurality of attributes in the subset evaluator important attribute group having a rank greater than zero and which are not designated as attributes for further consideration; ix) creating boosted attributes by increasing a normalized weight of each attribute in the subset evaluator important attribute group which is also designated as an attribute for further consideration; x) creating an order of attributes according to the normalized weight for each respective attribute, from the boosted attributes, the attributes designated for further consideration that are not in the boosted attributes, and the additional attributes designated for further consideration that are not in the boosted attributes; xi) generating an ordered attribute set for each attribute in one of the order of attributes and a modified order of attributes by ordering each occurrence of each attribute in each of the plurality of attribute importance models in a descending order according to a number of occurrences; xii) producing a normalized global rank for each attribute in one of the order of attributes and the modified order of attributes by multiplying the number of occurrences of each attribute in one of the order of attributes and the modified order of attributes by a number of occurrences of each attribute in each ordered attribute set, an average of the normalized weight of each respective attribute from the normalized attribute importance array and the normalized weight of each attribute from the boosted attributes; xiii) generating one of a normalized ranking list and a modified normalized ranking list for each attribute in the normalized global rank; and xiv) adjusting drilling operation based on one of the normalized ranking list and the modified normalized ranking list.

The subject matter of the present disclosure is described with specificity, however, the description itself is not intended to limit the scope of the disclosure. The subject matter thus, might also be embodied in other ways, to include different steps or combinations of steps similar to the ones described herein, in conjunction with other technologies. Moreover, although the term "step" may be used herein to describe different elements of methods employed, the term should not be interpreted as implying any particular order among or between various steps herein disclosed unless otherwise expressly limited by the description to a particular order. While the present description refers to the oil and gas industry, it is not limited thereto and may also be applied in other industries to achieve similar results.

Method Description

Figure 1B:
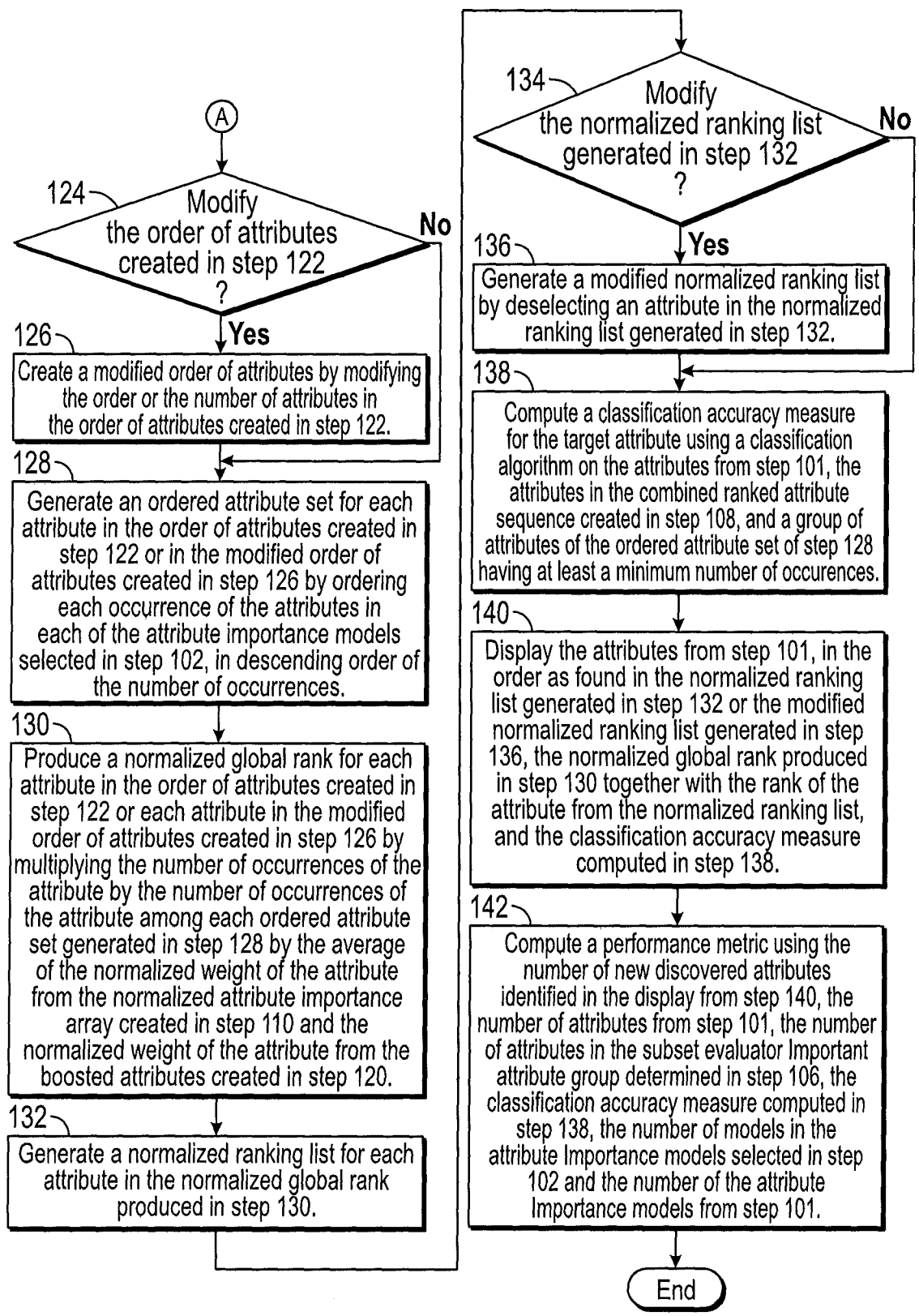

Referring now to FIGS. 1A and 1B, a flow diagram illustrates one embodiment of a method 100, which may sometimes be referred to as the SAK method. The SAK method is a generic algorithm-based, domain-expert assisted method of deriving important attributes using selected multiple attribute importance techniques, wherein each of the selected multiple attribute importance techniques use some or all of selected attributes, and then intelligently fuses the results of the selected multiple attribute importance techniques to arrive at a fused subset of important attributes. In particular, the method 100 takes the output of each of the selected multiple attribute importance techniques and arrives at a bridged and ranked set of attributes using a pan-method ranking mechanism that incorporates important aspects, such as the number of the selected multiple attribute importance techniques that utilize the selected attribute, the ranking of the attribute in each of the sets of attributes generated by the selected multiple attribute importance techniques, the membership of an attribute in a subset, and the extent of its influence, and more. The method 100 also allows for domain expert input at key stages and may be used in highly dimensional datasets.

In step 101, Attributes, Attribute Importance Models, Subset Evaluator Attribute Importance Models, Classifiers, Target Attributes, and a Constrained Model Mode and a Relaxed Model Mode are input.

Figure 4:
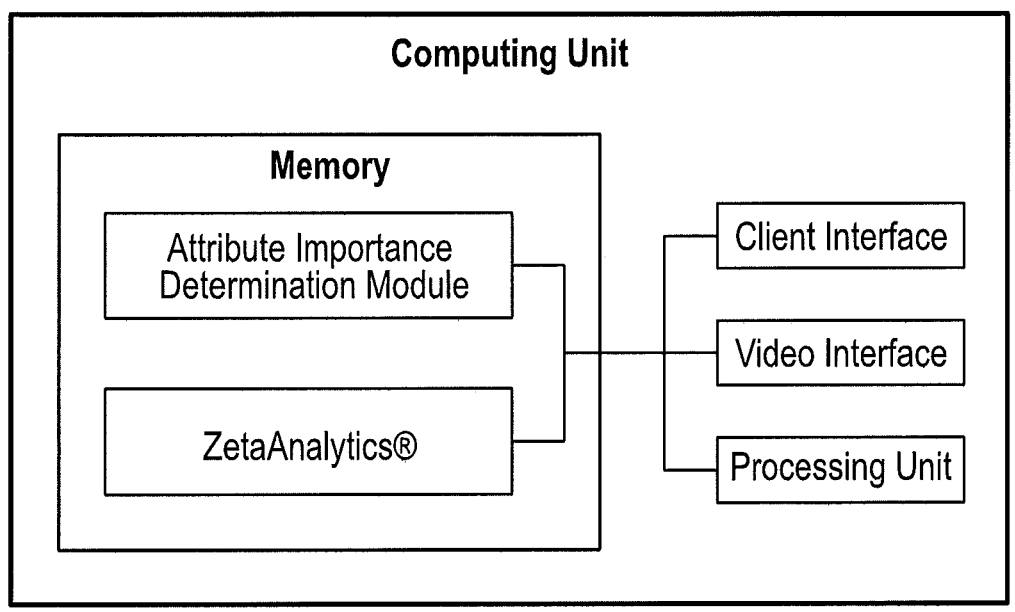
FIG. 4 is a block diagram illustrating one embodiment of a computer system for implementing the present disclosure.

In step 102, at least two models from the Attribute Importance Models, at least one model from the Subset Evaluator Attribute Importance Models, at least one classifier from the Classifiers, either the Constrained Model Mode or the Relaxed Model Mode, and a target attribute from the Target Attributes input in step 101 are selected for attribute importance determination using the client interface and/or the video interface described further in reference to FIG. 4 and techniques well known in the art.

In step 104, an Ordered Set of Attributes Group Having a Ranked Attribute Sequence is determined by applying the Attribute Importance Models selected in step 102 to the Attributes from step 101. The selected Attribute Importance Models are applied across the entire un-ordered set of selected Attributes.

In step 106, a Subset Evaluator Important Attribute Group is determined by applying the Subset Evaluator Attribute Importance Models, the Classifier, and either the Constrained Model Mode or the Relaxed Model Mode selected in step 102 to the Attributes from step 101. Thus, in step 106, the selected Subset Evaluator Attribute Importance Models are used to identify attribute subsets that influence the Target Attribute as a group. Using an input of unordered data sets with several attributes and a target attribute, the method 100 provides, using methods well known in the art, a subset array.

In step 108, a Combined Ranked Attribute Sequence is created by combining, in descending rank order, the Ordered Set of Attributes Group Having a Ranked Attribute Sequence determined in step 104 and the Subset Evaluator Important Attribute Group determined in step 106 according to the model mode selected in step 102. If the Constrained Model Mode is selected in step 102, then the output of each Subset Evaluator Attribute Importance Model is used as a pre-filter or restriction on the number of attributes to be further considered in the method 100, limiting the attributes in the Combined Rank Attribute Sequence to those attributes found in the Subset Evaluator Important Attribute Group determined in step 106. If the Relaxed Model Mode is selected in step 102, then the output of each Subset Evaluator Attribute Importance Model does not restrict the number of attributes to be further considered in the method 100.

In step 110, a Normalized Attribute Importance Array, with normalized weight, for each attribute in the Combined Ranked Attribute Sequence created in step 108 is created. Thus, for the Ordered Set of Attributes Group Having a Ranked Attribute Sequence determined in step 104, a Normalized Attribute Importance Array is generated by the method 100. In particular, the normalized attribute weight for each selected Attribute Importance Model may be computed by dividing the weight of the Attribute by the weight range for the selected Attribute Importance Model.

In step 112, a Tagged Attributes Set is created by tagging each attribute in the Combined Ranked Attribute Sequence created in step 108 with a partition number based on recursive partitioning of the attribute through the weight range of the Normalized Attribute Importance Array created in Step 110. The number of recursive partitions may be manually selected using the client interface and/or the video interface described further in reference to FIG. 4 and techniques well known in the art.

In step 114, a Conditional Maximum Number of Attributes is determined from the Tagged Attributes Set created in step 112 and the Subset Evaluator Important Attribute Group determined in step 106. The Conditional Maximum Number of Attributes determined in this step using a distribution-free approach, i.e. an approach irrespective of the distribution of the attributes, is one half of the total number of attributes having a non-zero ranking. Alternatively, a distribution-based approach, such as those known in the art, may be used to similarly determine the Conditional Maximum Number of Attributes.

In step 116, Attributes for Further Consideration are designated, namely the attributes in the highest two partitions of the Tagged Attributes Set created in step 112, which have non-zero ranks in the Normalized Attribute Importance Array created in step 110, and, to the extent the Conditional Maximum Number of Attributes determined in Step 114 has not been exceeded, the next highest attributes of the Tagged Attribute Set created in step 112 until the Conditional Maximum Number of Attributes determined in step 114 is met.

In step 118, Additional Attributes for Further Consideration are designated, namely the attributes of the Subset Evaluator Important Attribute Group determined in step 106 having a rank greater than zero and which are not among the Attributes for Further Consideration selected in step 116.

In step 120, Boosted Attributes are created by increasing the normalized weight according to a boost formula of each attribute from the Subset Evaluator Important Attribute Group determined in step 106 when the attribute is also found in the Attributes for Further Consideration designated in step 116. The normalized weight of the attribute is boosted, as it influences the target attribute as an individual as well as a group, by a Subset Boost Factor. The Subset Boost Factor is a normalized multiplicative factor defined as $$1 + \left( \left( \frac{\left( \sum_{i=1}^{ss} \frac{1}{\text{Number of attributes}_i} \right)}{\text{Total Number of attributes}} \right) * \text{Damping factor} \right)$$

where ss is the number of Subset Evaluator Attribute Importance Models selected in step 102, the Number of attributes$_i$ is the number of attributes found in the Subset Evaluator Important Attribute Group determined in step 106 for that Subset Evaluator Attribute Importance Model selected in step 102 (thus important attributes), and the Total Number of attributes is the number of attributes input in step 101. The Damping factor is defaulted to 0.75, but may be configured to another value.

In step 122, an Order of Attributes is created from the Boosted Attributes created in step 120, the attributes in the Additional Attributes for Further Consideration designated in step 118, which were not boosted in step 120, and the Attributes for Further Consideration designated in step 116, which were not boosted in step 120. The Order of Attributes is ordered by normalized weight. This ranked and ordered set of attributes by Attribute Importance Models may be presented to a domain expert, which may be a user or which may be an automated system.

In step 124, the method 100 determines whether to modify the Order of Attributes created in step 122 according to the domain expert. This step can be automated by storing domain expert preferences as rules and applying them in batch. If the domain expert elects to modify the Order of Attributes created in step 122, then the method 100 proceeds to step 126; otherwise the method 100 proceeds to step 128.

In step 126, a Modified Order of Attributes is created by modifying the order or the number of attributes in the Order of Attributes created in step 122, using the client interface and/or the video interface described further in reference to FIG. 4 and techniques well known in the art. This step can be automated by storing domain expert preferences as rules and applying them in batch.

In step 128, an Ordered Attribute Set is generated for each attribute in the Order of Attributes created in step 122 or in the Modified Order of Attributes created in step 126 by ordering each occurrence of the attributes in each of the Attribute Importance Models selected in step 102, in descending order of the number of occurrences.

In step 130, a Normalized Global Rank is produced for each attribute in the Order of Attributes created in step 122 or for each attribute in the Modified Order of Attributes created in step 126 by multiplying the number of occurrences of the attribute by the number of occurrences of the attribute among each Ordered Attribute Set generated in step 128 and by the average of the normalized weight of the attribute from the Normalized Attribute Importance Array created in step 110 and by the normalized weight of the attribute from the Boosted Attributes created in step 120.

In step 132, a Normalized Ranking List is generated for each attribute in the Normalized Global Rank produced in step 130 for display to a domain expert as a segmented ranked set together with the ranking number.

In step 134, the method 100 determines whether to modify the Normalized Ranking List generated in step 132 according to the domain expert. This step can be automated by storing domain expert preferences as rules and applying them in batch. If the domain expert elects to modify the Normalized Ranking List, then the method 100 proceeds to step 136; otherwise the method 100 proceeds to step 138.

In step 136, a Modified Normalized Ranking List is generated by deselecting an attribute in the Normalized Ranking List generated in step 132 using the client interface and/or the video interface described further in reference to FIG. 4 and techniques well known in the art. This step may be automated by storing domain expert preferences as rules and applying them in batch.

In step 138, a Classification Accuracy Measure for the target attribute, identifying the ratio of correct classifications of the target attribute selected in step 102 to the total number of instances in the data set of the target attributes selected in step 102, is determined using a classification algorithm known in the art, which uses the attributes from step 101, the attributes in the Combined Ranked Attribute Sequence created in step 108, and a group of attributes from the Ordered Attribute Set of step 128 having at least a minimum number of occurrences.

In step 140, the attributes from step 101 are displayed in the order as found in the Normalized Ranking List generated in step 132 or the Modified Normalized Ranking List generated in step 136, with the Normalized Global Rank produced in step 130, the rank of each attribute from the Normalized Ranking List generated in step 132, and the Classification Accuracy Measure for the target attribute is computed in step 138. The display enables the identification of any attribute that has a position in the Normalized Global Rank higher than a predetermined rank, which represents a new discovered attribute.

In step 142, a SAK Performance Metric (SAKPM) is computed for each Attribute Importance Model selected in step 102 using the number of new discovered attributes identified in the display from step 140, the number of attributes from step 101, the number of attributes in the Subset Evaluator Important Attribute Group determined in step 106, the Classification Accuracy Measure computed in step 138, the number of models in the Attribute Importance Models selected in step 102, the number of Attribute Importance Models from step 101. The SAKPM, as computed for each Attribute Importance Model selected in step 102, includes a dimensionality reduction measure, the Classification Accuracy Measure computed in step 138, and a discovery measure determined using the number of new discovered attributes identified in the display from step 140. Thus, the SAKPM may be generally presented as SAKPM=DR*A*D, where DR is the dimensionality reduction measure, A is the Classification Accuracy Measure for the target attribute computed in step 138, and D is the discovery measure. The dimensionality reduction measure is determined according to the following:

$$DR = \left(\frac{\text{total number of models}}{\text{number of reduced models}}\right)$$

where the total number of models is the number of Attribute Importance Models from step 101 and the number of reduced models is the number of different combined attribute importance models generated according to the method 100. Different combined attribute importance models may be generated by method 100 using a lower minimum number of occurrences of an attribute set from the Ordered Attribute Set of step 128. The discovery measure is determined according to the following:

$$D = \left[1 + \frac{\frac{\text{number of new discovered attributes} + 1}{\text{total number of attributes}}}{\frac{\text{number of new important attributes}}{\text{total number of attributes}}}\right]$$

where the number of new discovered attributes is the number of new discovered attributes identified in the display from step 140, the total number of attributes is the number of attributes from step 101, and the number of important attributes is the number of attributes in the Combined Ranked Attribute Sequence from step 108.

Example

As an example, the method 100 was tested on a hypothetical Stuck Pipe dataset and compared to the results of conventional attribute importance methods. The hypothetical highly dimensional Stuck Pipe dataset used was highly dimensional, with eighty-five attributes, making possible a high prediction of accuracy. Application of the selected attribute importance techniques to the hypothetical dataset, generated an identification of important attributes, from which the computation of accuracy and SAKPM was obtained.

In the example, the Attribute Importance Models selected in step 102 were ChiSquared, Corelation, GainRatio, Info-Gain, ReliefF, SVM, and SymmetricalUncert. The Subset Evaluator Attribute Importance Models selected in step 102 were Cfs—Best First search, Wrapper—Naïve Bayes classifier, Greedy Stepwise search. As a result, twenty-one (21) Attribute Importance Models are used. The Target Attribute is Stuck Pipe Present. Method 100 was performed in Relaxed Mode.

Figure 2:
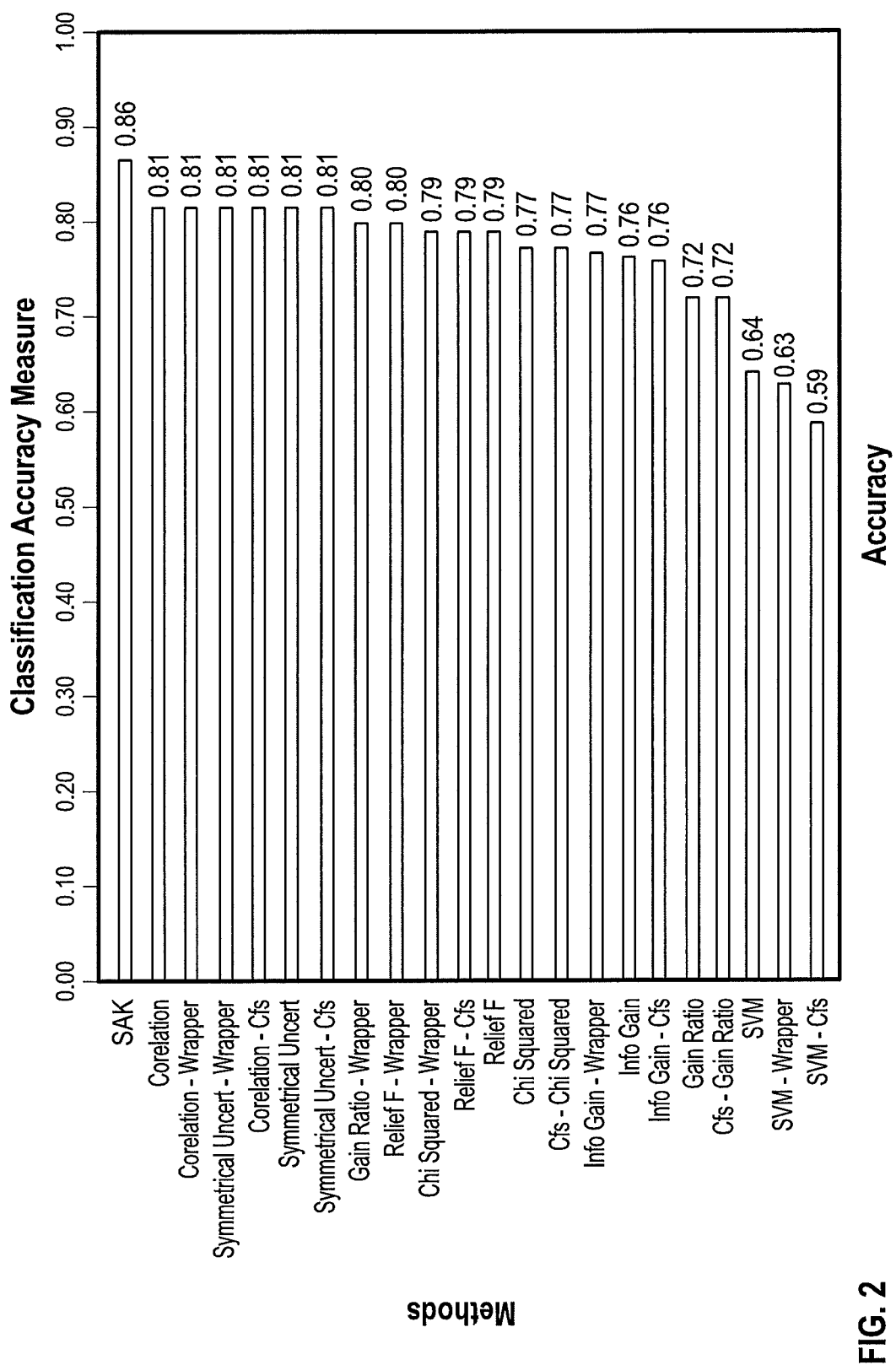
FIG. 2 is a bar graph illustrating the comparative accuracy of various attribute importance methods and the method in FIGS. 1A and 1B.

As illustrated in FIG. 2, the Classification Accuracy Measure for the target attribute of various attribute importance methods, including the method 100, is presented in a bar graph, confirming the method 100 provides comparative responses while avoiding the time consuming, manual and error prone task of running each of the other methods separately to obtain a compilation providing similar results.

Figure 3:
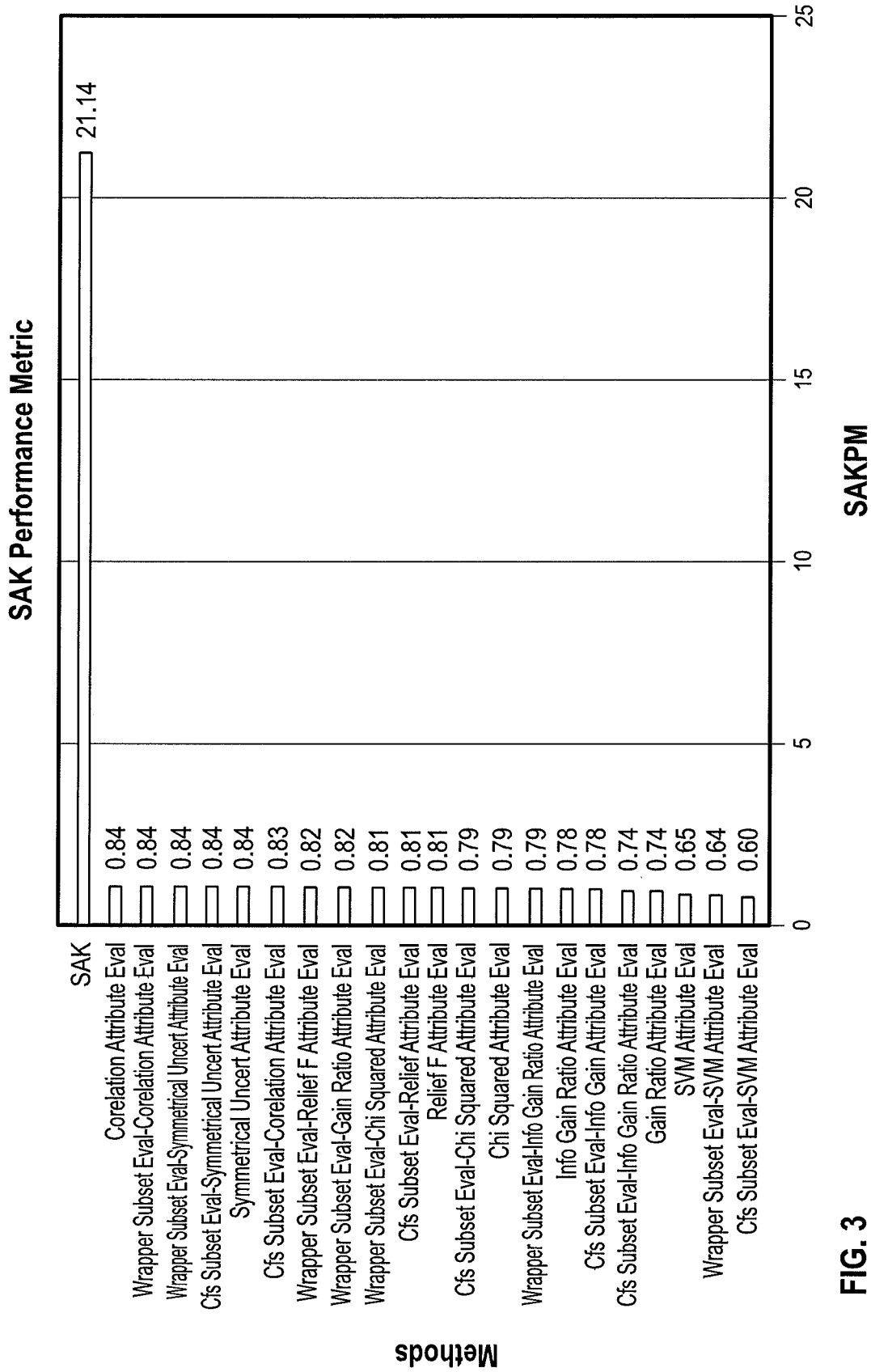
FIG. 3 is a bar graph illustrating the comparative performance metric of various attribute importance methods and the method in FIGS. 1A and 1B.

When the SAK Performance Metric of the method 100 is computed in step 142 for each of the selected Attribute Importance Models selected in step 102 and the SAK method, the SAK Performance Metric verifies the utility of the method 100 compared to the individual Attribute Importance Models, as illustrated in FIG. 3.

System Description

The present disclosure may be implemented through a computer-executable program of instructions, such as program modules, generally referred to software applications or application programs executed by a computer. The software may include, for example, routines, programs, objects, components, and data structures that perform particular tasks or implement particular abstract data types. The software forms an interface to allow a computer to react according to a source of input. ZetaAnalytics®, which is a commercial software application marketed by Landmark Graphics Corporation, may be used as an interface application to implement the present disclosure. The software may also cooperate with other code segments to initiate a variety of tasks in response to data received in conjunction with the source of the received data. The software may be stored and/or carried on any variety of memory such as CD-ROM, magnetic disk, bubble memory and semiconductor memory (e.g., various types of RAM or ROM). Furthermore, the software and its results may be transmitted over a variety of carrier media such as optical fiber, metallic wire, and/or through any of a variety of networks, such as the Internet.

Moreover, those skilled in the art will appreciate that the disclosure may be practiced with a variety of computer-system configurations, including hand-held devices, multi-processor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof, in a computer system or other processing system.

Referring now to FIG. 4, a block diagram illustrates one embodiment of a system for implementing the present disclosure on a computer. The system includes a computing unit, sometimes referred to as a computing system, which contains memory, application programs, a client interface, a video interface, and a processing unit. The computing unit is only one example of a suitable computing environment and is not intended to suggest any limitation as to the scope of use or functionality of the disclosure.

The memory primarily stores the application programs, which may also be described as program modules containing computer-executable instructions, executed by the computing unit for implementing the present disclosure described herein and illustrated in FIGS. 1A and 1B. The memory therefore, includes an Attribute Importance Determination module, which enables certain steps described in reference to FIGS. 1A and 1B. In particular, ZetaAnalytics® may be used as an interface application to perform steps 101, 102, 104, 105, 108 and 142 (in part) in FIGS. 1A and 1B. The Attribute Importance Determination module performs the remainder of the steps in FIGS. 1A and 1B. Although ZetaAnalytics® may be used as the interface application, other interface applications may be used, instead, or the Attribute Importance Determination module may be used as a stand-alone application. Many of the various steps are amenable to parallelization, particularly steps 104-122, steps 128-132, step 138 and step 142.

Although the computing unit is shown as having a generalized memory, the computing unit typically includes a variety of computer readable media. By way of example, and not limitation, computer readable media may comprise computer storage media and communication media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to and/or presently being operated on by the processing unit. By way of example, and not limitation, the computing unit includes an operating system, application programs, other program modules, and program data.

The components shown in the memory may also be included in other removable/nonremovable, volatile/nonvolatile computer storage media or they may be implemented in the computing unit through an application program interface ("API") or cloud computing, which may reside on a separate computing unit connected through a computer system or network. For example only, a hard disk drive may read from or write to nonremovable, nonvolatile magnetic media, a magnetic disk drive may read from or write to a removable, nonvolatile magnetic disk, and an optical disk drive may read from or write to a removable, nonvolatile optical disk such as a CD ROM or other optical media. Other removable/non-removable, volatile/nonvolatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above provide storage of computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, or the like. These and other input devices are often connected to the processing unit through the client interface that is coupled to a system bus, but may be connected by other interface and bus structures, such as a parallel port or a universal serial bus (USB).

A monitor or other type of display device may be connected to the system bus via an interface, such as a video interface. A graphical user interface ("GUI") may also be used with the video interface to receive instructions from the client interface and transmit instructions to the processing unit. In addition to the monitor, computers may also include other peripheral output devices such as speakers and printer, which may be connected through an output peripheral interface.

Although many other internal components of the computing unit are not shown, those of ordinary skill in the art will appreciate that such components and their interconnection are well known.

While the present disclosure has been described in connection with presently preferred embodiments, it will be understood by those skilled in the art that it is not intended to limit the disclosure to those embodiments. It is therefore, contemplated that various alternative embodiments and modifications may be made to the disclosed embodiments without departing from the spirit and scope of the disclosure defined by the appended claims and equivalents thereof.

The invention claimed is:

1. A method for determination of importance of attributes identified in a plurality of attribute importance models selected from a plurality of available attribute importance models, comprising:

determining an ordered set of attributes group by applying the plurality of attribute importance models to the plurality of attributes, the ordered set of attributes group having a plurality of attributes with a ranked attribute sequence;

determining a subset evaluator important attribute group by applying at least one subset evaluator attribute importance model, and at least one classifier to the plurality of attributes;

creating a combined ranked attribute sequence by combining, in descending rank order, the ordered set of attributes group and the subset evaluator important attribute group according to one of a constrained model mode and a relaxed model mode;

creating a normalized attribute importance array for each attribute in the combined ranked attribute sequence, the normalized importance array having a normalized weight;

creating a tagged attributes set by tagging each attribute in the combined ranked attribute sequence with a partition number based on recursive partitioning of the plurality of attributes through a weight range of the normalized attribute importance array;

determining a conditional maximum number of attributes from the tagged attributes set and the subset evaluator important attribute group;

designating, as attributes for further consideration, the plurality of attributes in a highest two partitions of the tagged attributes set having a non-zero rank in the normalized attribute importance array and a next highest attribute in the tagged attributes set until the conditional maximum number of attributes is met;

designating, as additional attributes for further consideration, each of the plurality of attributes in the subset evaluator important attribute group having a rank greater than zero and which are not designated as attributes for further consideration;

creating boosted attributes by increasing a normalized weight of each attribute in the subset evaluator important attribute group which is also designated as an attribute for further consideration;

creating an order of attributes according to the normalized weight for each respective attribute, from the boosted attributes, the attributes designated for further consideration that are not in the boosted attributes, and the additional attributes designated for further consideration that are not in the boosted attributes;

generating an ordered attribute set for each attribute in one of the order of attributes and a modified order of attributes by ordering each occurrence of each attribute in each of the plurality of attribute importance models in a descending order according to a number of occurrences;

producing a normalized global rank for each attribute in one of the order of attributes and the modified order of attributes by multiplying the number of occurrences of each attribute in one of the order of attributes and the modified order of attributes by a number of occurrences of each attribute in each ordered attribute set, an average of the normalized weight of each respective attribute from the normalized attribute importance array and the normalized weight of each attribute from the boosted attributes;

generating one of a normalized ranking list and a modified normalized ranking list for each attribute in the normalized global rank using a computer processor; and adjusting drilling operations based on one of the normalized ranking list and the modified normalized ranking list.

2. The method of claim 1, further comprising:
computing a classification accuracy measure for a target attribute using a classification algorithm on the plurality of attributes, each attribute in the combined ranked attribute sequence and each attribute of the ordered attribute set according to the number of occurrences.

3. The method of claim 2, further comprising:
identifying each attribute having a position in the normalized global rank higher than a predetermined rank as a new discovered attribute.

4. The method of claim 3, further comprising:
computing a performance metric using a number of new discovered attributes, a number of the plurality of attributes, a number of the plurality of attributes in the subset evaluator important attribute group, the classification accuracy measure for the target attribute, a number of the plurality of attribute importance models, and a number of the available attribute importance models.

5. The method of claim 1, wherein the modified order of attributes is created by removing at least one of the plurality of attributes from the order of attributes.

6. The method of claim 1, wherein the modified normalized ranking list is generated by removing at least one of the plurality of attributes from the normalized ranking list.

7. The method of claim 1 wherein each attribute in the combined ranked attribute sequence is limited by the constrained model mode to each attribute in the subset evaluator important attribute group.

8. A non-transitory storage device carrying computer executable instructions for determination of importance of attributes identified in a plurality of attribute importance models selected from a plurality of available attribute importance models, the instructions being executable to implement:

determining an ordered set of attributes group by applying the plurality of attribute importance models to the plurality of attributes, the ordered set of attributes group having a plurality of attributes with a ranked attribute sequence;

determining a subset evaluator important attribute group by applying at least one subset evaluator attribute importance model, and at least one classifier to the plurality of attributes;

creating a combined ranked attribute sequence by combining, in descending rank order, the ordered set of attributes group and the subset evaluator important attribute group according to one of a constrained model mode and a relaxed model mode;

creating a normalized attribute importance array for each attribute in the combined ranked attribute sequence, the normalized importance array having a normalized weight;

creating a tagged attributes set by tagging each attribute in the combined ranked attribute sequence with a partition number based on recursive partitioning of the plurality of attributes through a weight range of the normalized attribute importance array;

determining a conditional maximum number of attributes from the tagged attributes set and the subset evaluator important attribute group;

designating, as attributes for further consideration, the plurality of attributes in a highest two partitions of the tagged attributes set having a non-zero rank in the normalized attribute importance array and a next highest attribute in the tagged attributes set until the conditional maximum number of attributes is met;

designating, as additional attributes for further consideration, each of the plurality of attributes in the subset evaluator important attribute group having a rank greater than zero and which are not designated as attributes for further consideration;

creating boosted attributes by increasing a normalized weight of each attribute in the subset evaluator important attribute group which is also designated as an attribute for further consideration;

creating an order of attributes according to the normalized weight for each respective attribute, from the boosted attributes, the attributes designated for further consideration that are not in the boosted attributes, and the additional attributes designated for further consideration that are not in the boosted attributes;

generating an ordered attribute set for each attribute in one of the order of attributes and a modified order of attributes by ordering each occurrence of each attribute in each of the plurality of attribute importance models in a descending order according to a number of occurrences;

producing a normalized global rank for each attribute in one of the order of attributes and the modified order of attributes by multiplying the number of occurrences of each attribute in one of the order of attributes and the modified order of attributes by a number of occurrences of each attribute in each ordered attribute set, an average of the normalized weight of each respective attribute from the normalized attribute importance array and the normalized weight of each attribute from the boosted attributes;

generating one of a normalized ranking list and a modified normalized ranking list for each attribute in the normalized global rank; and adjusting drilling operations based on one of the normalized ranking list and the modified normalized ranking list.

9. The storage device of claim 8, further comprising: computing a classification accuracy measure for a target attribute using a classification algorithm on the plurality of attributes, each attribute in the combined ranked attribute sequence and each attribute of the ordered attribute set according to the number of occurrences.

10. The storage device of claim 9, further comprising: identifying each attribute having a position in the normalized global rank higher than a predetermined rank as a new discovered attribute.

11. The storage device of claim 10, further comprising: computing a performance metric using a number of new discovered attributes, a number of the plurality of attributes, a number of the plurality of attributes in the subset evaluator important attribute group, the classification accuracy measure for the target attribute, a number of the plurality of attribute importance models, and a number of the available attribute importance models.

12. The storage device of claim 8, wherein the modified order of attributes is created by removing at least one of the plurality of attributes from the order of attributes.

13. The storage device of claim 8, wherein the modified normalized ranking list is generated by removing at least one of the plurality of attributes from the normalized ranking list.

14. The storage device of claim 8 wherein each attribute in the combined ranked attribute sequence is limited by the constrained model mode to each attribute in the subset evaluator important attribute group.

15. A non-transitory storage device carrying computer executable instructions for determination of importance of attributes identified in a plurality of attribute importance models selected from a plurality of available attribute importance models, the instructions being executable to implement:
  determining an ordered set of attributes group by applying the plurality of attribute importance models to the plurality of attributes, the ordered set of attributes group having a plurality of attributes with a ranked attribute sequence;
  determining a subset evaluator important attribute group by applying at least one subset evaluator attribute importance model, and at least one classifier to the attributes;
  creating a combined ranked attribute sequence by combining, in descending rank order, the ordered set of attributes group and the subset evaluator important attribute group according to a constrained model mode that limits each attribute in the combined ranked attribute sequence to each attribute in the subset evaluator important attribute group;
  creating a normalized attribute importance array for each attribute in the combined ranked attribute sequence, the normalized importance array having a normalized weight;
  creating a tagged attributes set by tagging each attribute in the combined ranked attribute sequence with a partition number based on recursive partitioning of the plurality of attributes through a weight range of the normalized attribute importance array;
  determining a conditional maximum number of attributes from the tagged attributes set and the subset evaluator important attribute group;
  designating, as attributes for further consideration, the plurality of attributes in a highest two partitions of the tagged attributes set having a non-zero rank in the normalized attribute importance array and a next highest attribute in the tagged attributes set until the conditional maximum number of attributes is met;
  designating, as additional attributes for further consideration, each of the plurality of attributes in the subset evaluator important attribute group having a rank greater than zero and which are not designated as attributes for further consideration;
  creating boosted attributes by increasing a normalized weight of each attribute in the subset evaluator important attribute group which is also designated as an attribute for further consideration;
  creating an order of attributes according to the normalized weight for each respective attribute, from the boosted attributes, the attributes designated for further consideration that are not in the boosted attributes, and the additional attributes designated for further consideration that are not in the boosted attributes;
  generating an ordered attribute set for each attribute in one of the order of attributes and a modified order of attributes by ordering each occurrence of each attribute in each of the plurality of attribute importance models in a descending order according to a number of occurrences;
  producing a normalized global rank for each attribute in one of the order of attributes and the modified order of attributes by multiplying the number of occurrences of each attribute in one of the order of attributes and the modified order of attributes by a number of occurrences of each attribute in each ordered attribute set, an average of the normalized weight of each respective attribute from the normalized attribute importance array and the normalized weight of each attribute from the boosted attributes;
  generating one of a normalized ranking list and a modified normalized ranking list for each attribute in the normalized global rank; and
  adjusting drilling operations based on one of the normalized ranking list and the modified normalized ranking list.

16. The storage device of claim 15, further comprising: computing a classification accuracy measure for a target attribute using a classification algorithm on the plurality of attributes, each attribute in the combined ranked attribute sequence and each attribute of the ordered attribute set according to the number of occurrences.

17. The storage device of claim 16, further comprising: identifying each attribute having a position in the normalized global rank higher than a predetermined rank as a new discovered attribute.

18. The storage device of claim 17, further comprising: computing a performance metric using a number of new discovered attributes, a number of the plurality of attributes, a number of the plurality of attributes in the subset evaluator important attribute group, the classification accuracy measure for the target attribute, a number of the plurality of attribute importance models, and a number of the available attribute importance models.

19. The storage device of claim 15, wherein the modified order of attributes is created by removing at least one of the plurality of attributes from the order of attributes.

20. The storage device of claim 15, wherein the modified normalized ranking list is generated by removing at least one of the plurality of attributes from the normalized ranking list.

* * * * *